Dec. 27, 1960 W. E. GIFFORD 2,966,037
GAS PURIFICATION
Filed May 5, 1958 2 Sheets-Sheet 1
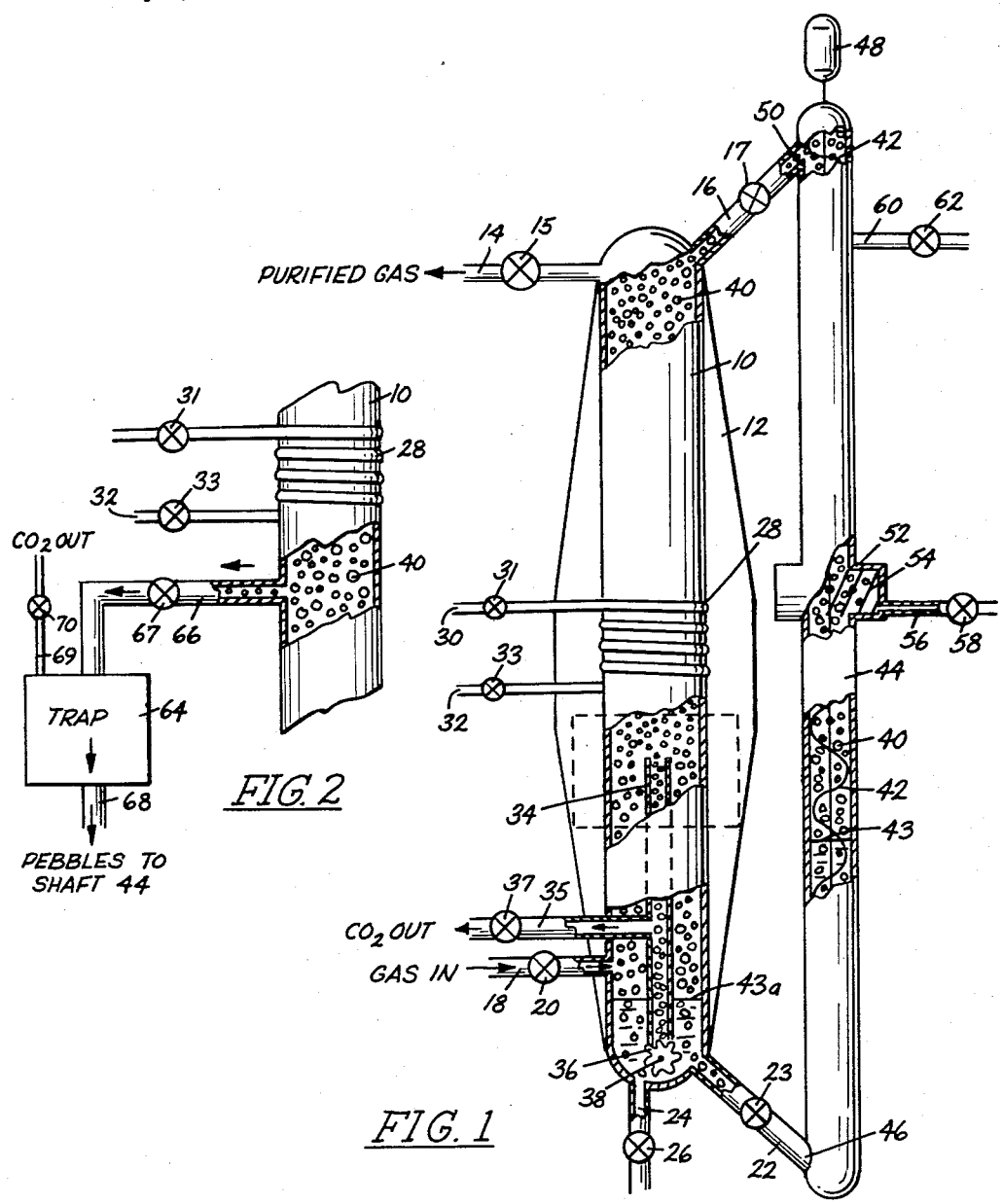
INVENTOR.
WILLIAM E. GIFFORD
BY
ATTORNEY Dec. 27, 1960 W. E. GIFFORD 2,966,037
GAS PURIFICATION
Filed May 5, 1958 2 Sheets-Sheet 2

INVENTOR.
WILLIAM E. GIFFORD
BY
ATTORNEY

United States Patent Office 2,966,037
Patented Dec. 27, 1960

2,966,037

GAS PURIFICATION

William E. Gifford, Lexington, Mass., assignor to Arthur D. Little, Inc., Cambridge, Mass., a corporation of Massachusetts Filed May 5, 1958, Ser. No. 733,098

16 Claims. (Cl. 62—13)

This invention relates to the purification of a gas stream and more particularly to the removal of impurities therefrom.

In many industrial processes and particularly in those in which a stream of gas is to be liquefied, or merely cooled below the temperature at which impurities such as water, $CO_2$ and oil solidfy, it is necessary to remove these impurities to prevent clogging of lines and even possible eventual destruction of the apparatus involved.

In present-day equipment it is common to use one or more systems for removing condensible impurities. Among such systems are gas driers, chemical reactants (such as a caustic $CO_2$ remover) and low-temperature systems such as charcoal traps and reversing heat exchangers. All of these methods for removing condensible impurities are relatively costly to build and maintain. The high cost is primarily due to one or more factors such as the amount of heat which must be supplied or removed, the necessity for complicated apparatus associated for example with reversing heat exchangers, or the requirement for constantly replacing reactants. Moreover, in many applications it is necessary to combine the use of two of these systems for removing condensible impurities. For example, many liquid oxygen plants use both a gas drier and a caustic $CO_2$ removal system. Those oxygen plants which use reversing heat exchangers must of course provide duplicate heat exchange systems in order that one may be warmed while the other is being used.

It would be desirable to have a means for removing the condensible impurities from a gas stream consisting of a simple piece of apparatus which is reliable in operation, simple in construction and requires a minimum amount of refrigeration and overall operating costs.

It is therefore an object of this invention to provide means for removing condensible impurities from a gas stream, such means being simple to construct and operate and hence achieving a material savings in cost both with respect to capital outlay and upkeep cost. It is another object to provide apparatus which is capable of removing condensible impurities from a gas stream rapidly and efficiently. It is a further object to provide a system for removing condensible impurities from a gas stream which requires a minimum amount of refrigeration. It is yet another object to provide an inexpensive heat exchanger. Still another object is to provide a process for removing condensible impurities from a gas stream which is continuous, requires no chemical reactant replacement, no cleaning of charcoal traps and no intermittent shutdowns.

These and other objects will be apparent in the following discussion.

By the process of this invention condensible impurities are removed from a gas stream by contacting a gas to be purified with a circulating heat transfer surface in the form of relatively small individual or discrete entities (generally referred to herein as heat transfer plates or pebbles) moving through the gas stream in a direction counter-current to the direction of the flow of the stream and cooling this mass, during a portion of the period of contacting, to a temperature low enough to cause condensation or solidification of the impurities. The impurities which solidfy on the heat transfer surface are removed with the circulating plates or pebbles, while the impurities which condense are drawn off at or near the point where the contact between the gas stream and the plates or pebbles is broken. Inasmuch as $CO_2$ is the most common impurity which solidifies, it will be used as an example in the following description. However, solidified impurities are not limited to $CO_2$ and may include methane and the like. The plates or pebbles are recirculated after having the solidified impurities removed and after being dried if necessary.

The apparatus of this invention comprises a heat exchange column having impure gas inlet means in the bottom portion and pure gas outlet means in the top portion and conveyor means adjacent and connected to the heat exchange column for continuously circulating the moving heat transfer surface. The connection between the heat exchange column and the conveyor means is such that the individual heat transfer surfaces (plates or pebbles) are introduced at the top of the heat exchange column and withdrawn at the bottom. The heat exchange column and conveyor means may be contained in two separate housings or may be two sides of a single continuous housing. Cooling means are located near the central portion of the heat exchange column and are thermally bonded to it.

The term "heat exchange pebble" is used herein to designate any small solid geometric figure which is capable of efficient heat exchange and "heat exchange plate" any relatively flat plate-like heat transfer surface which may be foraminous or otherwise constructed to give an optimum heat transfer surface.

This invention may now be described in detail with reference to the following drawings in which Fig. 1 is a side view, partly in cross-section, of one type of apparatus suitable for removing condensible impurities from a gas stream in accordance with this invention;

Fig. 2 is a side view, partly in cross-section, of the portion of the apparatus designed to remove solidified impurities, and illustrates a modification of the corresponding portion of the apparatus of Fig. 1;

Figures 3, 4:
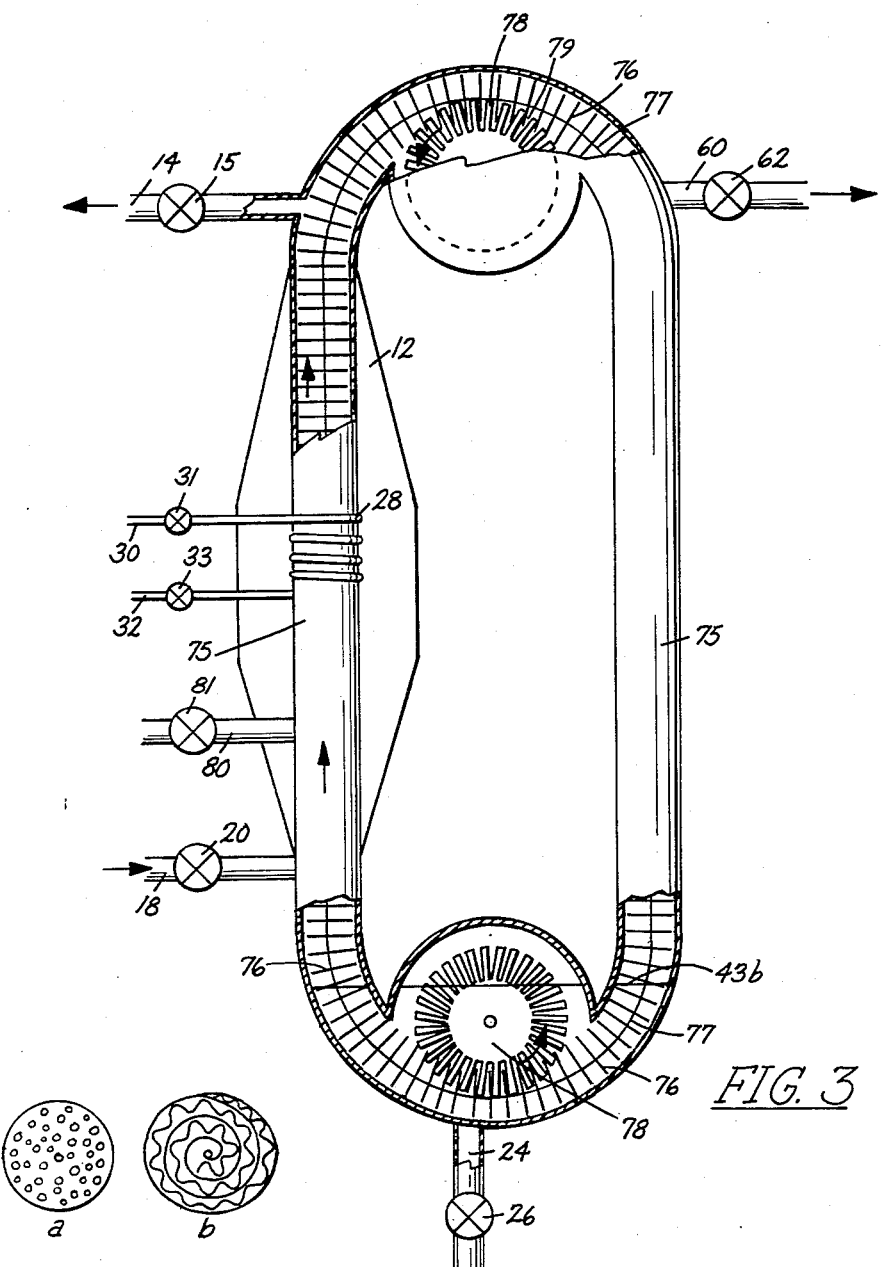
Fig. 3 is a side view, partly in cross-section, of another type of apparatus suitable for removing condensable impurities from a gas stream according to this invention.
Fig. 4 illustrates two possible designs for heat transfer plates.

In the apparatus as illustrated in Fig. 1 there is provided a main heat exchange column 10, in the form of a generally vertically disposed, elongated passageway preferably surrounded by some form of insulation 12, and having located in its upper portion a gas outlet line 14 controlled by valve 15, and a heat exchange pebble inlet line 16 controlled by valve 17. Located in the bottom portion of main heat exchange column 10 is a gas inlet line 18 controlled by valve 20, and a heat exchange pebble outlet line 22 controlled by valve 23. A drawoff arm 24 controlled by valve 26 for removing a portion of the condensible impurities leads off from the bottom of heat exchange column 10. Surrounding a more or less central portion of main heat exchange column 10 is a belt of refrigeration coils 28 in which any suitable refrigerant is introduced through line 30 and valve 31 and removed through line 32 and valve 33. The refrigeration coils 28 are thermally bonded to the outside wall of column 10 and may be finned for more efficient heat exchange.

Located within main heat exchange column 10 and below the location of the refrigeration coils 28 is a standpipe 34 which extends downwardly to just above the junction of heat exchange pebble drawoff arm 22 and column 10. Standpipe 34 is closed at this bottom end by any suitable gate arrangement such as a gear 36, which may be rotated on pin 38 to control the flow of heat exchange pebbles out from standpipe 34. Standpipe 34 is equipped with a drawoff arm 35 having valve 37 to remove gaseous impurities which have condensed on the heat exchange pebbles entering standpipe 34. As the pebbles are permitted to travel downwardly in standpipe 34 they are warmed by the incoming air and the condensed impurities are revaporized and led off through arm 35.

Heat exchange pebbles 40 are circulated through the system by means of a suitable conveying device such as that illustrated in Fig. 1. This conveying device comprises a hoist arrangement consisting of any suitable lifting mechanism such as screw conveyor 42 contained in an elevator shaft 44. The heat exchange pebbles enter the shaft by means of outlet arm 22 driven by force of gravity which requires that the port 46 through which the pebbles are introduced into shaft 44 be lower than the point at which drawoff arm 22 joins the bottom portion of main heat exchange column 12. The screw drive, or other suitable hoist arrangement, which moves the heat exchange pebbles vertically through the shaft, may be driven by any suitable device such as motor 48. The pebbles leave shaft 44 at port 50 which is the connection point of outlet arm 16 and shaft 44. As the gas flows upward through the column around the heat exchange pebbles, there will be a small pressure drop. To prevent any gas from entering drawoff arm 22 and going through the shaft 44, a head of water, mercury or other suitable liquid is supplied to offset the pressure drop. The levels of this liquid are indicated in the drawing as 43 in the shaft 44 and 43a in the main heat exchange column 10. The use of a liquid to control pressure means that the heat exchange pebbles, as they are carried up through the shaft 44 and beyond the liquid level 43, will become wet and some means are required to dry them before they are reintroduced into main heat exchange column 12. Two ways in which these heat exchange pebbles may be dried are illustrated in Fig. 1. These schemes may be used as alternate methods of drying or in combination.

The first of these drying methods consists of placing in the column a drier 52 which contains a water-absorbing material such as felt 54 with which the pebbles come in contact during their upward movement. The heat exchange pebbles in contacting this material are wiped essentially dry. Inasmuch as there is a positive pressure existing in shaft 44 moisture will be forced out of the absorption material through line 56 which may be equipped with valve 58. When the valve is open and the apparatus is in operation, water will be continuously expelled through line 56.

As an alternative method of drying the heat exchange pebbles, or as an additional drying system, a portion of the dry purified gas reaching the top of column 10 may, by throttling valve 17, be led through pebble inlet arm 16 into the top portion of shaft 44 where it contacts the pebbles as they are being moved up and into column 10. This by-pass air, after it has absorbed the moisture from the pebbles, is led off through line 60 which may contain valve 62. This air may in turn then be re-circulated to enter column 10 by way of line 18 or it may be permitted to escape.

An alternative arrangement for removing those heat exchange pebbles on which the $CO_2$ has condensed is shown in Fig. 2. In this arrangement standpipe 34, along with its gate 36, and lead-off line 35, is replaced in the system by an auxiliary heat exchange pebble trap 64 which is connected to main heat exchange column 10 by means of line 66 and valve 67. In this arrangement a portion of the cooled heat exchange pebbles, on which $CO_2$ has solidified, is drawn off below the location of the refrigerating coils 28 and above that point at which the pebbles will be warmed sufficiently to revaporize the $CO_2$. The heat exchange pebbles in trap 64 are then warmed up to vaporize the $CO_2$ and are returned by means of line 68 to the bottom portion of shaft 44 to be re-circulated into the system. The gaseous $CO_2$ leaves trap 64 by line 69 and valve 70. Although this alternate method of removing the condensed $CO_2$ is as effective as that shown in Fig. 1, it has the disadvantage of depriving the system of the additional refrigeration which the cold pebbles, which have been drawn off, might contribute in cooling the incoming gas. Thus there is some loss in efficiency in using the arrangement of Fig. 2.

Fig. 3, in which like numbers refer to like components of Fig. 1, shows another type of apparatus which may be used to remove condensible impurities from a gas stream in accordance with this invention. In this modification the pebbles 40 are replaced by suitable heat exchange plates 76 which are permanently affixed to an endless chain or belt continuously moving through the path defined by the elliptical type housing 75. The individual heat transfer surfaces or plates 76 may be thin metal pieces, preferably of a foraminous nature, or they may be any other type of heat transfer surface which achieves an optimum heat transfer area for the design. Two modifications of heat transfer surfaces suitable for the individual heat transfer plate 76 are illustrated in top plane views in Fig. 4. In Fig. 4, modification A, shows a round plate having a plurality of holes punched therein. Modification B illustrates a heat transfer surface made up of spirally wound strips of metal separated by a continuous corrugated strip. These heat transfer plates are preferably constructed of materials which exhibit good heat transfer properties.

In the apparatus of Fig. 3 the impure gas enters through line 18 and, as in the case of Fig. 1 passes upward around and through the heat transfer plates 76 in the same manner in which it passes around the pebbles 40 of Fig. 1. Also as in the case of Fig. 1 the heat transfer plates 76 are cooled as they are carried downward through the belt of refrigeration coils 28. As the incoming warm gas moving upwardly strikes the cooled heat transfer plates 76 the impurities such as carbon dioxide and methane which solidify under these conditions are condensed on the plate. The concentration of these solidified impurities builds up on the plates much in the same manner that it does on the pebbles. After the plates have moved further downward in the cycle, the warm gas moving upward revaporizes the solidified impurities and they are drawn off through arm 80 controlled by valve 81. In drawing off the revaporized impurities at this point a small quantity of the incoming gas to be purified is also drawn off, but the concentration of the impurities has increased at this point to such an extent that the loss of gas to be purified is minor. Of course, the gas drawn off through arm 80 may in turn be purified or otherwise processed.

As in the case of the apparatus of Fig. 1 a level 43b is present to maintain proper pressure levels throughout the system. The warm side of the heat exchanger (i.e., that shown on the right side of Fig. 3) may contain a drying arrangement suitable for removing the liquid from the heat transfer plates as in the case of Fig. 1. These heat transfer plates may also be dried by throttling valve 15 and directing a portion of the dry, purified gas over the heat transfer plates in the upper portion of the cycle and out through line 60.

Circulation of the heat transfer plates 76 is accomplished by any suitable means such as by permanently affixing them to endless belt 77 which is driven by a rotating member such as wheel 78. In the modification of Fig. 3 wheel 78 has grooves 79 into which heat transfer plates fall as the endless belt 77 is advanced. Other suitable arrangements will occur to those skilled in the art. Wheels 78 are driven by any suitable means not shown.

The purification cycle of this invention may now be illustrated with reference to Fig. 1. It will be assumed for the purpose of illustration only that it is desired to remove condensible impurities from an air stream prior to its entry into an air separation plant such as may be used to produce liquefied oxygen and liquefied nitrogen. Air at 100 p.s.i. and 300° K. is delivered from a compressor (not shown) by way of line 18 and open valve 20 into the bottom portion of main heat exchange column 12. As it is driven upwardly, it contacts heat exchange pebbles 40 which are flowing under gravity down through heat exchange column 12. As the air contacts the heat exchange pebbles, it is cooled by the pebbles which in turn have been cooled in the region surrounded by refrigeration coils 28. In cooling the gas stream, water and oil are condensed out and flow downwardly along with the pebbles to collect on the bottom of the column and mix with the liquid provided there to maintain the proper pressure head. As the air moves upwardly beyond the open end of the standpipe 34, it is cooled sufficiently so that the $CO_2$ present solidifies on the heat exchange pebbles. A small portion of these pebbles containing solidified $CO_2$ find their way into the entrance of standpipe 34 and move downwardly through pipe 34, the rate of their movement being controlled by the gate 36 which continuously permits a few of these heat exchange pebbles to leave and be transferred to the pebble outlet arm 22 and into shaft 44.

In moving down standpipe 34 the heat exchange pebbles are warmed through heat exchange with the warm air coming in through line 18. Thus the $CO_2$ is revaporized and the greater part of it passes out of the system through drawoff line 37. A minor portion of the revaporized $CO_2$ is permitted to pass up through standpipe 34. This is necessary in order to provide a sufficient pressure differential between the gas in standpipe 34 and the gas stream moving upwardly so that no appreciable amount of the gas to be purified will tend to flow backwards through standpipe 34. There is established, in the region approximately defined by the upper entrance of standpipe 34 and the bottom portion of that area in the column which is surrounded by refrigeration coils 28, a distillation area wherein the $CO_2$ is condensed and revaporized and hence concentrated on the heat exchange pebbles passing through this area. This makes for an efficient removal of $CO_2$ since by concentrating it on a few heat exchange pebbles, it is possible to remove it much more efficiently. It would otherwise be difficult to remove a condensible impurity which is normally present in air only to the extent of 0.03%.

By the time the air stream has passed upwardly through main heat exchange column 12 to the point where it reaches outlet line 14, it is free of water, $CO_2$, oil and any other condensible impurity. In the example used here, the refrigeration coils are maintained at approximately 85° K. and the air that leaves the column through line 14 will be at approximately 295° K. and 99 p.s.i.

The flow of heat exchange pebbles through the system of Fig. 1 may be traced, beginning at the point where they are introduced into main heat exchange column 12 through inlet arm 16. The heat exchange pebbles as they enter column 12 are at approximately room temperature or between about 295 to 300° K. in this example. As they flow downwardly through column 12, they contact air which has been cooled in the region surrounded by refrigeration coils 28, and the pebbles themselves are cooled. By the time the heat exchange pebbles have passed through the area surrounded by refrigeration coils 28, they are sufficiently cooled to permit the condensation of $CO_2$ on their surface. As they pass further into column 10, the major portion of them, which travels around standpipe 34, is warmed by the incoming air and in being warmed, they cool the air. When the heat exchange pebbles reach the level of the liquid, they have again returned to more or less normal temperature.

A minor portion of the cold heat exchange pebbles will enter the standpipe 34 and travel downwardly in this pipe at a slower rate of speed than those heat exchange pebbles moving outside standpipe 34. Their rate of travel will be determined by the gate mechanism 36. As the heat exchange pebbles move downwardly in standpipe 34 they are warmed by the warm incoming air and the condensed $CO_2$ on their surfaces will revaporize and flow upward as a gas. The major portion of the gaseous $CO_2$ will leave the system by line 35 but some of it will continue to flow upward to provide the positive pressure at the entrance of standpipe 34 necessary to prevent any appreciable amount of the gas to be purified from leaking back into standpipe 34. If required, the gas leaving the system from line 35 may be periodically (or continuously) analyzed to determine whether any quantity of the gas stream is leaking out.

By reason of the temperature differentials set up in the lower half of column 10, there is established in that portion of the column defined by the dotted lines in Fig. 1 a refluxing area in which the $CO_2$ is condensed on the heat exchange pebble surfaces and then revaporized. The total effect is much the same as in a distillation column and the $CO_2$ is concentrated on a few heat exchange pebbles for efficient removal.

Passing through the liquid, the heat exchange pebbles enter the bottom part of shaft 44 and are raised by screw drive 42 beyond the liquid level and through the drying mechanisms provided. Thus as explained above, they may contact a water absorption material such as felt 54 and may be wholly or partially dried in this manner. As they are raised upwardly through shaft 44, they may also contact some of the bypassed air brought in from column 12 to dry or to finish drying them. In this dried condition they are ready to begin the cycle over again.

If the alternate method of removing $CO_2$ is used, then a trap 64 such as is shown in Fig. 2 is provided. In this method, a number of heat exchange pebbles are continuously removed at a point in the cycle where the pebbles are at a sufficiently low tempertaure to have $CO_2$ solidified on their surface. Thus the $CO_2$ is removed as a solid and removed from the pebbles by vaporization while in trap 64. The clean pebbles are reintroduced into the cycle and the $CO_2$ gas vented from trap 64.

The heat exchange pebbles which are suitable for the practice of this invention are formed from a material which preferably exhibits a high volume heat capacity. Such material may be aluminum or a ceramic for example. The heat exchange pebbles are preferably spherical in shape since spheres possess the best flow characteristics. The heat exchange pebbles are preferably ⅛ inch in diameter or larger. Although smaller pebbles exhibit excellent heat transfer properties, their surface to volume ratio is exceedingly high, a fact which means that the amount of water which must be removed from them in the drying processes is almost prohibitively excessive. Of course, heat exchange pebbles larger than ⅛ inch diameter may be used, and the maximum size will depend upon the size of equipment employed. Generally, the larger the equipment, the larger the pebbles may conveniently be. However, in all cases it is a matter of balancing the heat exchange properties of the pebbles against the amount of moisture which must be removed from them to obtain an optimum balance between these two factors.

The purification cycle of the apparatus of Fig. 3 is precisely the same as that for Fig. 1, except that the heat transfer plates 76 are substituted for the heat transfer pebbles 40 of Fig. 1.

In the operation of the apparatus in Fig. 3, the individual heat transfer plates perform in the same capacity as the pebbles 40 of Fig. 1. As these plates move down through the cold zone established by the refrigeration coils 28 they are cooled and the condensation mechanism by which the impurities are solidified is the same. Likewise those impurities which condense in liquid form are deposited on the heat transfer plates as on the pebbles and are removed in the same manner described for Fig. 1. The impurities which have solidified are revaporized by contact with the upwardly moving warm impure gas and are removed in concentrated form through line 80.

It will be seen from the above description of this invention that by virtue of the continuous motion and regenerative action of the heat exchange plates or pebbles there is provided a very efficient heat exchange which requires very little refrigeration from an outside source. The system of this invention effectively and efficiently removes all condensible impurities from a gas stream and thus provides a simple, easily operated and inexpensive piece of auxiliary equipment which may be used in connection with any industrial plant requiring a purified gas stream. It is of particular interest as an auxiliary for an air separation plant.

Many variations and embodiments are possible which make use of the teaching of this invention and it is the intent to include such variations and embodiments within the scope of this invention and as defined in the claims.

I claim:

1. Apparatus for removing condensible impurities from a gas stream, comprising a movable heat transfer surface in the form of individual solid entities, a heat exchange column having gas inlet means at the bottom, gas outlet means at the top, and localized cooling means, located near its central portion and thermally bonded thereto and arranged to provide out-of-contact cooling with the adjacent interior of said column thereby to establish a localized distillation zone within said heat exchange column, heat transfer surface conveyor means arranged to move said individual entities through said heat exchange column in a direction countercurrent to the direction of flow of said gas stream and means for directing said gas stream upward subsequent to its entrance into said column through said gas inlet means.

2. Apparatus in accordance with claim 1 wherein said individual entities are heat transfer pebbles.

3. Apparatus in accordance with claim 1 wherein said individual entities are heat transfer plates.

4. Apparatus for removing condensible impurities from a gas stream, comprising a large number of heat exchange pebbles, a heat exchange column having gas inlet means and pebble outlet means at the bottom and gas outlet means and pebble inlet means at the top, localized cooling means located near the central portion of said column and in heat exchange relationship therewith, pressure-controlling liquid means within said column the liquid level of which is below said gas inlet means, conveying means outside said column for moving said pebbles from said pebble outlet means to said pebble inlet means in said heat exchange column, and drying means associated with said conveying means for periodically removing said liquid from said pebbles, said pebbles being present in sufficient quantity to substantially fill said column.

5. Apparatus in accordance with claim 4 including means located within said heat exchange column for isolating a minor portion of said heat exchange pebbles on which carbon dioxide has solidified and means for returning the pebbles so isolated to said conveying means.

6. Apparatus in accordance with claim 4 including means for removing a minor portion of said heat exchange pebbles from said heat exchange column at a point where said pebbles are sufficiently cooled to have carbon dioxide solidified on their surface.

7. Apparatus for removing condensible impurities from a gas stream, comprising a large number of heat exchange pebbles, a heat exchange column having gas inlet means and pebble outlet means at the bottom and gas outlet means and pebble inlet means at the top, external localized cooling coils located in the central portion of said column and in heat relationship therewith thereby to cool said heat exchange pebbles, pressure-controlling liquid means within said column the liquid level of which is below said gas inlet means, shaft means located outside said heat exchange column containing means for elevating said heat exchange pebbles and being connected with said pebble outlet means and said pebble inlet means, drying means associated with said shaft means for periodically removing said liquid from said pebbles, and means for removing carbon dioxide solidified on a minor portion of said heat exchange pebbles and means for removing condensed impurities in liquid form from said column.

8. Apparatus for removing condensible impurities from a stream of gas containing the same by countercurrent contact of said stream with a body of pebbles, comprising an elongated, vertically disposed passageway, a body of pebbles substantially filling the same, gas inlet means and pebble outlet means adjacent the bottom of said passageway, gas outlet means and pebble inlet means adjacent the top of said passageway, external localized cooling means intermediate the ends of said passageway adapted to cool the stream and the pebbles adjacent to said cooling means and within said passageway thereby to cool said pebbles, pressure-controlling liquid means within said passageway the liquid level of which is below said gas inlet means, conveying means adapted to move said pebbles from said pebble outlet means to said pebble inlet means and thereby to cause said pebbles to move downwardly through said passageway by gravity and drying means associated with said conveying means for periodically removing said liquid from said pebbles.

9. Apparatus for removing condensible impurities from a gas stream, comprising a plurality of individual heat transfer surfaces, a heat exchange column having gas inlet means at the bottom, gas outlet means at the top and cooling means located near its central portion and thermally bonded thereto, draw-off means located below said cooling means to remove those impurities which solidify, pressure-controlling liquid means within said column the liquid level of which is below said gas inlet means, conveying means for continuously moving said heat transfer surfaces through said heat exchange column in a direction counter to the direction of flow of said gas in said column and drying means associated with said conveying means for periodically removing said liquid from said heat transfer surfaces.

10. Apparatus in accordance with claim 9 wherein said individual heat transfer surfaces are foraminous plates.

11. Process for removing condensible impurities from a gas stream, comprising the steps of contacting warm incoming gas to be purified with a movable heat transfer surface consisting of a plurality of individual solid entities moving through said gas in a direction countercurrent to the direction of flow of said gas, passing said entities through a cooling zone during a portion of said contacting step thereby to cool said heat transfer surface, establishing a distillation zone below said cooling zone whereby condensible impurities are concentrated on said entities, recirculating said entities, and removing the condensed impurities from the surface of said entities and from the point where said contacting is terminated and said entities enter the recirculating step.

12. Process for removing condensible impurities from a gas stream, comprising the steps of contacting the gas to be purified with a stream of heat exchange pebbles moving within an elongated passageway through said gas in a direction countercurrent to the direction of flow of said gas, cooling said pebbles during a portion of said contacting step to the extent that those of said impurities which liquefy are deposited as a liquid on a first portion of said pebbles and those of said impurities which solidify concentrate as a solid on a second portion of said pebbles, maintaining a liquid at a predetermined level within said passageway to minimize pressure drop of said gas during said contacting step, removing the impurities deposited as a liquid on said first portion of pebbles beyond the point where said contacting is terminated, removing the impurities condensed as a solid on said second portion of pebbles by vaporization, drawing off the resulting purified gas stream, removing said liquid from said pebbles and recirculating said pebbles.

13. Process in accordance with claim 12 wherein the step of removing the impurities condensed as a solid consists of conducting said second portion of pebbles in the same direction but out of contact with said first portion to vaporize said solid impurity and removing the resulting vapor from the system.

14. Process in accordance with claim 12 wherein the step of removing the impurities condensed as a solid consists of removing said second portion of pebbles from said system to accomplish said vaporization.

15. Apparatus in accordance with claim 9 wherein said drying means comprises a liquid-absorbing material located in the path of movement of said entities.

16. Apparatus in accordance with claim 9 wherein said drying means comprises conduit means associated with said gas outlet means and adapted to circulate a portion of the resulting purified gas in contact with said entities.

References Cited in the file of this patent

UNITED STATES PATENTS

| | | |
|---|---|---|
| 2,375,255 | Rollman | July 5, 1949 |
| 2,479,496 | Keith | Aug. 16, 1949 |
| 2,560,469 | Ogorzaly | July 10, 1951 |
| 2,561,720 | Alleman | July 24, 1951 |
| 2,601,298 | Keith | June 24, 1952 |
| 2,603,667 | Pankratz | July 15, 1952 |
| 2,696,718 | Garbo | Dec. 14, 1954 |
| 2,702,091 | Smith | Feb. 15, 1955 |